United States Patent
Ludwig et al.

(10) Patent No.: US 7,382,763 B2
(45) Date of Patent: Jun. 3, 2008

(54) COMMUNICATION DEVICE AND METHOD

(75) Inventors: Reiner Ludwig, Kensington, CA (US); Farooq Khan, Parlin, NJ (US); Bela Rathonyi, Malmo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1078 days.

(21) Appl. No.: 10/644,473

(22) Filed: Aug. 20, 2003

(65) Prior Publication Data
US 2004/0039833 A1    Feb. 26, 2004

Related U.S. Application Data

(63) Continuation of application No. 09/353,853, filed on Jul. 15, 1999, now Pat. No. 6,697,352.

(30) Foreign Application Priority Data

Jul. 15, 1998  (EP) .................................. 98113212
Jan. 21, 1999  (EP) .................................. 99101121

(51) Int. Cl.
*H04J 3/24* (2006.01)
(52) U.S. Cl. ...................... 370/349; 370/392; 370/466; 370/468
(58) Field of Classification Search ................ 370/349, 370/474, 328, 338, 348, 352–356, 389–394, 370/465–469; 709/220–226
See application file for complete search history.

(56) References Cited

U.S. PATENT DOCUMENTS

| | | | |
|---|---|---|---|
| 5,708,655 A | 1/1998 | Toth et al. | 370/313 |
| 5,889,772 A * | 3/1999 | Fisher et al. | 370/346 |
| 5,987,022 A | 11/1999 | Geiger et al. | 370/349 |
| 6,034,949 A * | 3/2000 | Gellhaus et al. | 370/252 |
| 6,240,514 B1 * | 5/2001 | Inoue et al. | 713/153 |
| 6,400,712 B1 | 6/2002 | Phillips | 370/355 |

FOREIGN PATENT DOCUMENTS

| | | |
|---|---|---|
| EP | 98113212.9 | 1/1999 |
| WO | WO 95/31060 | 11/1995 |

OTHER PUBLICATIONS

IBM Technical Disclosure Bulletin, vol. 38, No. 1, Jan. 1995, "Packet Fragmentation by Interface Hardware", pp. 15-16; XP000498672.

(Continued)

*Primary Examiner*—Chi Pham
*Assistant Examiner*—Alexander O. Boakye

(57) ABSTRACT

In the present invention, the implementation of a protocol that embeds packets is made sensitive to the type of data being embedded, so that adjustable parameters can be set automatically at the layer providing the parameters being adjusted in accordance with the packets being embedded. Thus it is taken into account that the data in packets being received from a higher layer in order to be encapsulated or segmented and sent further (either directly into the link or on to lower layer), may be classified into different categories with respect to the adjustable parameters, where the parameters can automatically be adjusted for an individual packet in accordance with the category into which is classified.

35 Claims, 10 Drawing Sheets

OTHER PUBLICATIONS

Proceedings of 8th International Symposium on Personal, Indoor and Mobile Radio Communications,—PIMRC '97, Helsinki, Finland, vol. 2, Sep. 1997, *"Voice and Data Integration on TCP/IP Wireless Networks"*, pp. 678-682, XP002089273.

W. Richard Stephens, *TCP/IP Illustrated, vol. 1, The Protocols*, Addison-Wesley Professional Computing Series, pp. vii-xix and 1-576, Massachusetts.

Blake, S. et al. "An Architecture for Differentiated Services". RfC-2475, pp. 1-39. ftp://ftp.isi.edu/in-notes/rfc2475.txt.

Nichols, K. et al. "Definition of the Differentiated Services Field (DS Field) in the IPv4 and IPv6 Headers". RfC-2474, pp. 1-22. ftp://ftp.isi.edu/in-notes/rfc2474.txt.

Simpson, W. "The Point-to-Point Protocol (PPP)". RfC-1661, pp. 1-57. ftp://ftp.isi.edu/in-notes/rfc1661.txt.

Reynold, J. et al. "Assigned Numbers". RfC-1340, pp. 1-147. ftp://ftp.isi.edu/in-notes/rfc1340.txt.

\* cited by examiner

COMMUNICATION DEVICE AND METHOD

This application is a continuation of U.S. patent application Ser. No. 09/353,853, which was filed on Jul. 15, 1999 now U.S. Pat. No. 6,697,352.

FIELD OF THE INVENTION

The present invention relates to a device and method for sending data packets, for example over a link establishing a connection between a computer and a packet exchange network such as the so called Internet.

BACKGROUND OF THE INVENTION

With the progress in data processing and communications technology over the past years, the establishment of data exchange networks has become an important fixture in many aspects of the modern world, e.g. in the scientific and military community, but also with strongly increasing growth in the business and private realm. The best example of this is the steadily rising offer and demand of services in the world wide communication network commonly referred to as the Internet. In principle, the term "internet" simply refers to a network consisting of other networks, so that the world wide "Internet" is only an example, albeit a very well known one.

The commonly used data exchange principle for networks is that of packet exchange. This means that the data to be sent is broken down into units. Rules for sending and receiving such units, as well as rules for the structure of the units themselves are determined by so called protocols. Protocols are sets of rules that allow the communication between a sending end and a receiving end, as the rules specify how and in what form data to be sent has to be prepared, such that the receiving end may interpret the data and react in accordance to protocol defined rules to which both partners in the communication adhere.

An important concept for allowing the exchange of data between different networks, and thereby between numerous kinds of software and hardware, is that of protocol layering. This means that a number of protocols (sometimes also referred to as a suite) is organized in a hierarchy of layers, where each layer has specific functions and responsibilities. This will briefly be explained by referring to an example illustrated in FIGS. 3 to 5. A more detailed description of this concept is e.g. given in "TCP/IP Illustrated, Volume 1, The Protocols" by W. Richard Stevens, Addison-Wesley, 1994.

The Transmission Control Protocol (TCP) and the Internet Protocol (IP) are examples of protocols according to which communication over the Internet may be handled. What is commonly referred to as TCP/IP, however, comprises other protocols as well. The so-called TCP/IP suite has four layers, as shown in FIG. 3. The link layer handles the input and output of data into the physical communication media, e.g. a cable or a radio connection. It typically is implemented in the device driver in the operating system and the corresponding network interface card in the computer. The network layer handles the movement of packets around the network, e.g. routing. IP is an example of a network layer protocol. The transport layer provides a flow of data for the application layer above. For example, TCP is at the transport layer. An alternative to TCP is the User Datagram Protocol (UDP). The application layer is constituted by the application program sending or receiving data, e.g. an e-mail program.

A communication between two points then has the schematic form shown in FIG. 4. Data is first handed down through the layers and input into the physical connection on the sending side, and then handed up through the layers on the receiving side. This is indicated by the solid line arrows. The elements handling the data at a given layer in accordance with a protocol specified for that layer (e.g. TCP at the transport layer in the example of FIG. 4) are also referred to as peers. In other words, the transport layer in the example of FIG. 4 is handled by a TCP peer. It should be noted that the physical connection shown at the bottom of FIG. 4 may again consist of one or more protocol layers of its own, depending on the type of connection. This will be explained in more detail further on.

FIG. 5 illustrates the mechanism of passing data through the layers. The typical basic structure of a packet has two parts, namely a header and a payload part. The header contains information on the type of data contained in the payload part and communication control information for the respective layer. As can be seen in FIG. 5, at the application layer user data is processed by adding a header. The resulting data unit or packet is passed to the transport layer, where e.g. a TCP header is added. This TCP header contains information for the TCP peer on the receiving side. The resulting packet is sometimes also referred to as a TCP segment. Then this TCP segment is passed to the network layer, where in the example of FIG. 5 an IP header is added that e.g. contains routing information. The resulting packet is also referred to as an IP datagram. Finally, the IP datagram is passed to the link layer, where a header associated with the link layer protocol (LLP), e.g. the Point-to-Point Protocol (PPP), is added. The resulting packet is often called a frame. The frame also receives a start flag and an end flag, such that a receiver may recognize where a frame begins and where it ends. This process of embedding a packet of a higher layer in a larger packet of a lower layer is referred to as encapsulation.

On the receiving side, the user data is extracted by steps of de-encapsulation in the opposite order of what is shown in FIG. 5. It should be noted that the above description only refers to an example, and variations are possible. For example, some protocols not only add headers, but also trailers.

It should be remarked that a packet need not originate from the application layer, much rather a lower layer may generate a packet, e.g. for sending specific information regarding only that layer to the corresponding peer at the receiving end. An example of this is the sending of Link Control Protocol (LCP) packets prior to sending higher layer data, where said LCP packets are used by the link layer peers to configure the (physically established) link in accordance with parameters that are adjustable and/or negotiable at the link layer.

The representation in FIG. 4 is only very schematic, as it implies that the four individual peers on each side are respectively implemented in one location. This is possible, but in reality the situation is usually more complicated. FIG. 6 schematically shows an example of a communication between an IP-host 1 and an IP-host 2. The top part of the figure represents the physical communication path, and the lower part of the figure shows the logical communication path associated with the various protocols employed. The example of FIG. 6 relates to a connection to the Internet via a GSM network.

IP-host 1 can e.g. be a laptop computer. The terminal adaptation function TAF can be fulfilled e.g. by a PCMCIA interface card that is connected to the mobile station MS, e.g. a cellular telephone. The mobile station MS communicates with a base transceiver station BTS, which in turn is connected to a base station controller BSC. The connection to a public switched telephone network PSTN is accomplished by a modem in the interworking function IWF of the mobile switching center MSC associated with the base transceiver station BTS. It may be noted that due to the fact that GSM is digital, the TAF is not a modem. Finally, the PSTN provides the connection to an Internet services provider ISP, who in turn provides a gateway to the Internet. The physical connection between the Internet and IP-host 2, e.g. a personal computer to which an e-mail from IP-host 1 is to be sent, is not shown.

As can be seen in the lower part of FIG. 6, a TCP peer, an IP peer and a PPP peer are implemented at IP-host 1. The corresponding TCP peer and an IP peer reside in IP-host 2, whereas an IP peer and PPP peer are implemented at the Internet services provider ISP.

An important aspect of the layering scheme is that the different layers are "transparent". This means that the peers in a layer are oblivious to what happens in another layer. As an example, the PPP peers establish a pseudo-dedicated PPP connection between the IP-host 1 and the Internet services provider ISP. The two PPP peers operate independently of what type of physical connection is used, i.e. independently of which specific protocols are provided in lower layers. Equally, the PPP peers pass packets coming from higher layers transparently, i.e. with out regarding their contents.

In the example of FIG. 6, a forward error correction (FEC) layer and an interleave layer are provided between the mobile station MS and the base transceiver station BTS, a layer 2 relay (L2R) and a radio link protocol (RLP) connection are established between the terminal adaptation function TAF and the mobile switching center MSC, and V.42 and V.32 interfaces are established between the interworking function IWF and the Internet service provider ISP. All of these protocols are known and, except for RLP, will not be discussed further.

It should be noted that although the RLP is responsible for transporting data units from higher layers, this is not done by means of encapsulation, i.e. by one higher layer data unit being fit into one lower layer data unit, much rather RLP performs segmentation, i.e. one higher layer data unit is divided into a plurality of segments and each segment is placed into a lower layer data unit. In other words, the RLP data units are smaller than the higher layer data units (e.g. a PPP frame) they transport. The principle of placing data units of a higher layer in data units of a lower layer will be referred to as embedding in this description, which comprises both encapsulation and segmentation.

As can be seen from the above, packets associated with different protocols are sometimes referred to differently, e.g. frame, segment, datagram etc. For the purpose of clarity, the present description uses the term "packet" generically as meaning any data unit that has a defined syntax, and a data structure specified by a predetermined protocol. "Data structure" means that specific data at defined locations (addresses) has a specific meaning defined by the respective protocol. An example of this will be explained in connection with FIG. 7, in which a frame structure in accordance with the high-level data link control protocol (HDLC) is shown. HDLC is a very basic protocol, and e.g. PPP has adopted many of the basic features of HDLC.

FIG. 7 shows a HDLC frame that has an address field, a control field, an information field and a check field. In HDLC, the address field, control field and information field are of variable length, but the check field has a fixed length defined by the protocol. For example, the information field is simply defined as those octets that follow the control field and precede the check value.

A field is therefore an example of a defined location in the above sense, and a protocol will define that a specific number in a specific field is to be interpreted in a given way, i.e. the number has a specific meaning defined by the protocol.

Problem Underlying the Invention

With regard to the sending of packets, it is known to provide modes of transmission reliability, e.g. the above mentioned HDLC allows two modes of transmission reliability, namely the so called numbered mode (or I-mode) and the so called unnumbered mode (or UI-mode).

In the numbered mode, if it is determined that a sent packet was not correctly received by the receiving peer, then the sending peer performs retransmission of said packet. In this way it can be assured that all packets are correctly transmitted, although this can cause a delay in total transmission time, depending on how many packets have to be retransmitted. The information on the correct receipt of packets will typically be communicated by means of acknowledgment messages from the receiving peer to the sending peer, and the precise flow control for the transmission and retransmission will usually be performed by using the concept of sliding windows (so-called window based flow control), according to which a sender may send out more than one packet before receiving a acknowledgment, i.e. does not have to wait for an acknowledgment for each packet before sending out the next one. These principles of flow control are well known in the art, e.g. in the above mentioned book by Stevens, and do not need to be repeated here.

In contrast to the numbered mode, the unnumbered mode does not provide for retransmission. This means that packets are simply sent out in the given order, regardless of their being received correctly by the receiving peer. This mode has the advantage of faster transmission, but transmission reliability depends on the quality of the physical connection.

Transmission reliability is especially a problem in connections that comprise radio links. In the example of FIG. 6, the radio link protocol RLP is run. All known implementations of RLP are fixedly set to run in the numbered mode. In this way, the reliable transmission of data over a radio link, whose transmission quality can strongly fluctuate, is ensured. It is known to implement such systems as shown in FIG. 6 in such a way that the mobile station MS can request during connection set-up that no RLP be run (also referred to as a transparent circuit-switched GSM data service in the context of the example of FIG. 6). This reduces the transmission delay, but at the price of reduced transmission reliability.

This problem is not restricted to the RLP or to radio links, but basically occurs in any protocol that provides a reliability mode such as the above mentioned numbered mode.

Moreover, there generally appears the problem of choosing appropriate operating modes for the transmission of packets at a certain layer.

From the Request for Comments (RfC) 2475 by Blake et al., December 1998 (http://www.ietf.org/html.charters/diff-serv-charter.html), a proposal for an architecture for differentiated services is known. RfC 2475 suggests classifying and marking packets to receive a particular per-hop forwarding behavior (PHB) on nodes along their path. Header information in the header of a packet belonging to a given protocol layer is used exclusively by implementations of said given protocol layer. The differentiated services architecture is based on a model where traffic entering a network is classified and possibly conditioned at the boundaries of the network, and assigned to different behavior aggregates. Each behavior aggregate is identified by a single differentiated services (DS) codepoint. Packet classifiers are described, which select packets in a traffic stream based on the content of some portion of the packet header. As already mentioned, the DS codepoint or DS field, which belongs to the IP layer, is only used at the IP layer. A behavior aggregate classifier is described, which classifies packets based on the DS codepoint only. Also, a multi-field classifier is described, which selects packets based on the value of a combination of one or more header fields.

OBJECT OF THE INVENTION

It is the object of the present invention to generally provide a mechanism for implementations of protocols that solves the above problem and makes the control for choosing operating modes more efficient, e.g. enables a better relation between transmission reliability and transmission speed.

DESCRIPTION OF INVENTION

This object is solved by the device and method described in the independent claims, where a communication device is provided for generating data packets to be sent out having a first data structure determined by a first predetermined protocol, which is arranged to receive data packets of a second structure determined by a predetermined second protocol and generating said data packets of said first structure by embedding each data packet of said second structure in one or more data packets of said first structure, and which comprises a discriminator means that is arranged to discriminate said data packet of said second structure according to predetermined rules, on the basis of the contents of said data packets of said second structure.

Advantageous embodiments are described in the dependent claims.

According to the present invention, the implementation of a protocol is made sensitive to the type of data being sent, so that the setting of parameters relevant for the transmission can be adjusted automatically at the layer setting the parameters being adjusted in accordance with the contents of the packets to be sent. In other words, the present invention can take into account that the data in packets being received from a higher layer in order to be encapsulated or segmented and sent further (either directly into the link or on to lower layer), may be classified into different categories with respect to the adjustable parameters, where the parameters can automatically be adjusted for the individual packet in accordance with the category into which is classified.

The term contents refers to any contents. It should be noted that the specific type of contents used for discriminating may therefore be data consciously added to the packet by the originator of the packet at a specific layer in view of the discrimination operation at a lower layer, i.e. there is a scheme through which higher layer peers may specify information to lower layer peers in order to influence operating modes at the lower layer, e.g. by using a predetermined field of the higher layer protocol, or the discrimination operation at the lower layer will be conducted independently and individually, i.e. without any active influence from higher layers, namely by parsing for data that does not carry the intention of conveying information to lower layers, e.g. the protocol ID in a header.

The present invention therefore develops a concept that basically contradicts the firmly established teaching that all layers must operate independently of one another. In contrast to what is known, namely the possibility of having a higher layer set a specific parameter (e.g. reliability) at a lower layer when setting up the connection, the present invention makes the implementation of a given protocol at a given layer intelligent, such that it can flexibly and according its own determinations continuously set the parameters depending on what type of packets are to be sent.

According to a preferred embodiment of the present invention, the adjustable parameters relate to the reliability mode, such that the reliability mode (e.g. the numbered or unnumbered mode) is adjusted automatically at the layer performing the embedding, on the basis of the discrimination result.

This preferred embodiment provides the advantage that data packets suitable for different transmission reliability modes can automatically be sent simultaneously between peers of the layer at which the present invention is applied. For example, if the present invention is applied to an implementation of the RLP that embeds PPP packets by segmentation, which in turn encapsulate packets of higher layers, such as IP and above that TCP or UDP, then the RLP implementation in accordance with the invention can discern the packets containing UDP packets and those containing TCP packets, and can e.g. send the UDP packets in the unnumbered mode and the TCP packets in the numbered mode at the RLP layer.

As already indicated in this last example, the embodiment relating to the setting of reliability modes is preferably applied to the implementation of the protocol at the link layer (e.g. RLP). Also, the classification into categories is preferably done by taking into account the transmission reliability provisions of the higher layer packets being classified. In the above example, the UDP packets were classified into a category such that they are sent in the unnumbered mode, which is advantageous, as the UDP itself does not provide for retransmission of corrupted packets. By contrast, TCP provides for retransmission. By applying the present invention, it is possible to send TCP packets and UDP packets simultaneously at the RLP layer, but nonetheless each packet in the appropriate transmission reliability mode at said RLP layer, which means that the TCP packets can be sent with the desired or necessary reliability in the numbered mode, whereas the UDP packets are not unnecessarily delayed by potential retransmissions by also being sent in the numbered mode.

In connection with the above example, the invention offers great advantages. PPP is used to transport multiple protocols, such as IP, LCP (link control protocol), PAP (password authentication protocol) etc. simultaneously over a serial link. A PPP protocol identifier identifies which protocol data unit (PDU) or protocol packet is contained in a particular PPP packet. IP, which in turn is carried by PPP, can carry packets of multiple protocols, namely TCP, UDP and ICMP (Internet Control Message Protocol), which are also distinguished by a protocol identifier in the IP header. The different protocols that are eventually transported by PPP have different requirements requiring the trade-off between reliability versus delay. Consequently, either the numbered or the unnumbered mode of RLP is appropriate for certain data streams. More specifically, signaling messages such as LCP or PAP should be carried in the numbered mode, whereas real-time data streams (e.g. voice information for an Internet-telephone conversation sent in UDP packets) can usually tolerate losses but are more delay sensitive, which is best served with the unnumbered mode.

In the known implementations and systems this conflict could not be solved. If RLP fixedly running in the numbered mode is used, then a real-time UDP data stream can not run in parallel on a mobile computing device with a data stream (e.g. TCP) that requires the numbered mode. If RLP is not used, then after the circuit-switched connection is established, which means that charges are incurred, the establishment of the PPP link can fail, because LCP packets may get corrupted in the unnumbered mode. Consequently, the subscriber would have to pay for the call but not receive the desired service.

The present invention solves this conflict, because according to the invention the RLP implementation will automatically send the LCP messages in the numbered mode, whereby safe PPP link establishment is ensured, and then send following PPP packets containing UDP packets in the unnumbered mode, so that these are not unnecessarily delayed. Moreover, not only can such a conflict between different kinds of packets sent at different times during one connection be solved, but the present invention also allows two conflicting streams (in terms of reliability) to be sent in parallel, e.g. the above mentioned UDP data stream together with the TCP packets.

It should be noted that the above mentioned protocols and the above mentioned situation are only examples that are used to better explain the embodiment and its advantages. As already mentioned, the embodiment relating to the setting of reliability modes can be applied to any implementation of a protocol that allows for two or more reliability modes. For example, it can also be applied if LLC (Logical Link Control) packets are to be sent over a RLC (Radio Link Control) link. Equally well, the place of implementation is naturally not restricted to the above example of FIG. 6, but will be wherever it is suitable or desirable for the given protocol. For example, in a General Packet Radio Service (GPRS), it would be the TAF and the GSN (GPRS Support Node).

In effect, this means that the application of the present invention to the setting of reliability modes automatically provides virtual transmission reliability channels for the respective number of transmission reliability modes that are provided or chosen, where the implementation places specific types of packets in a specific virtual channel. In the context of the above example, this means that two virtual channels are provided, because there are two transmission reliability modes, i.e. a numbered channel and an unnumbered channel are provided, and TCP packets (more specifically: packets embedding TCP packets) are placed in the numbered channel, and UDP packets are placed in the unnumbered channel.

Expressing the above example in more general terms, the invention may be applied to the transmission scheme of ARQ-based error correction (ARQ=Automatic Repeat reQuest), where the choice of an operating mode (i.e. a reliability mode in this context of ARQ) may be based on the contents of packets being embedded. The possible modes are naturally not restricted to only two, i.e. unreliable (UI-mode) and reliable (I-mode), but may also have a larger number, such as there being a semi-reliable mode in addition to the UI-mode and I-mode, said semi-reliable mode being a combination of the two others with in-sequence-delivery or out-of-sequence delivery.

As can be seen above, the present invention may be applied to the setting of reliability modes, but is by no means restricted thereto. Quite to the contrary, the present invention is applicable to the setting or adjusting of any kind of operating mode in the context of embedding higher layer packets at a lower layer. More specifically, the present invention is applicable to all transmission schemes which have at least two different operating modes, such as the transmission scheme of FCS-based error detection (FCS=Frame Check Sequence) with the operating modes of e.g. the receiver discarding erroneous frames, the receiver marking but not discarding erroneous frames, and the receiver neither marking nor discarding erroneous frames, where the discriminating operation may naturally be made in view of any two of the modes or all three. Or the invention is applicable to the transmission scheme of FEC-based error correction (FEC=Forward Error Control) with the operating modes of e.g. using one of two or more FEC schemes. Or the invention is applicable to the transmission scheme of interleaving-based error prevention with the operating modes of e.g. using one of two or more interleaving schemes. Or the invention is applicable to the transmission scheme of power control with the operating modes of e.g. using one of two or more power levels. Or the invention is applicable to the transmission scheme spreading-based error prevention (in spread-spectrum technologies such as CDMA) with the operating modes of e.g. using one of two or more spreading factors. Or the invention is applicable to the transmission scheme of frame length control with the operating modes of using e.g. one of two or more possible frame lengths. Or the invention is applicable to the transmission scheme of bandwidth reservation control with the appropriate operating modes such as the allocation of 1, 2, 3, . . . or 8 time slots e.g. in the GPRS communication standard.

An important advantage of the present invention lies in the fact that it in principal does not require the alteration of any protocols, but only of its peer implementations, so that it can be applied universally in any appropriate context without compatibility or transition problems.

According to another preferred embodiment, the present invention is applied to provide a way of transmitting packets at a lower layer in accordance with transmission quality requests (such as QoS (Quality of Service) requirements and/or transmission priorities) specified by peers of a higher layer, where the packets or data units of said higher layer are embedded at said lower layer. The peers of the higher layer use the packets of said layer as a vehicle for conveying said quality requests to the lower layer, i.e. there is a standardized scheme by which said quality requests can be understood by implementations of both layers. As an example, this can be done by using a predefined field in the header of the higher layer packets and standardizing the contents of said field. In other words, a type of control channel is provided for conveying quality requests from the higher layer to the lower layer. Said quality requests are not only used to map higher layer packets or flows (a flow is a uniquely identifiable stream of packets) to operating modes provided for the transmission at the lower layer, but also to dynamically adapt the operation modes themselves, at least in part on the basis of said quality requests.

It may be noted that the transmission quality requests are a type of control information that may be used as a quality command for letting the higher layer set a specific operating mode at the lower layer, or may be used by the lower layer implementation liberally such that the lower layer implementation chooses the operating mode for a given packet carrying said quality request on the basis of said quality request, but the higher layer has no direct influence on which mode the lower layer will choose.

Further aspects and advantages of the present invention will become more readily understandable from the following detailed description of preferred embodiments, in which reference is made to the figures which illustrate these preferred embodiments.

DETAILED DESCRIPTION OF PREFERRED EMBODIMENTS

The present invention will be described by way of embodiments relating to the setting of transmission reliability modes. As already mentioned, this is a preferred application of the invention and serves well to illustrate the invention. However, the invention is generally applicable to the setting of any kind of adjustable parameter, e.g. also to the setting of security modes.

Figure 1:
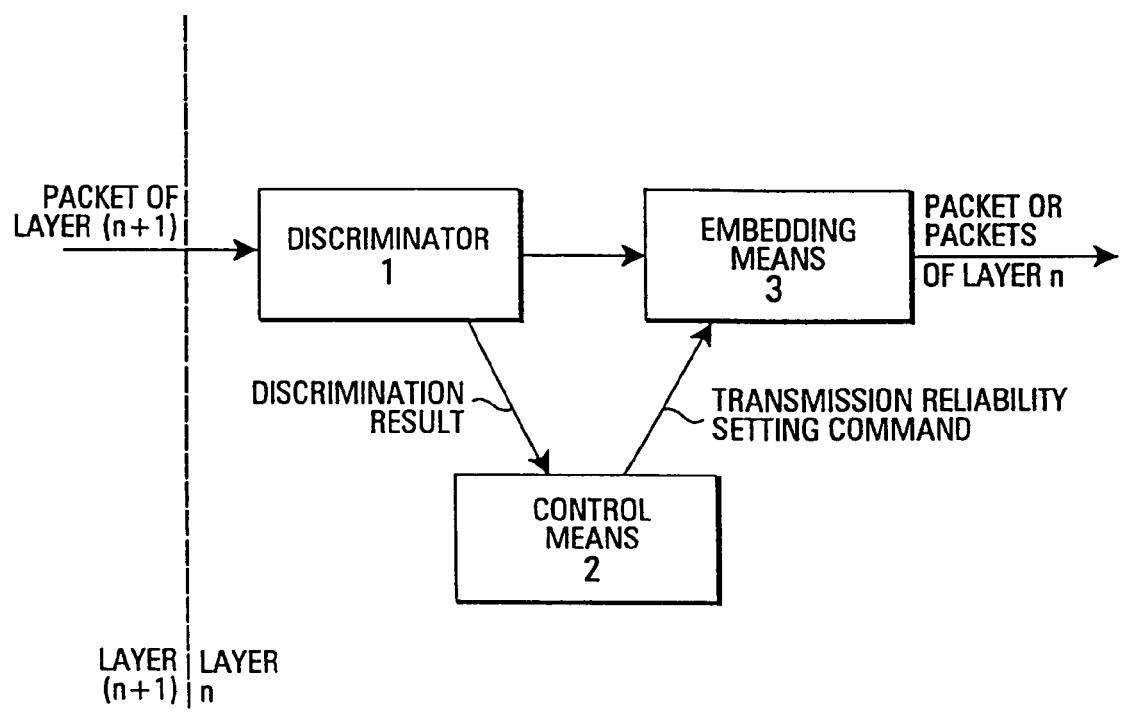
FIG. 1 is a block diagram showing an embodiment of a communication device according to the present invention.

A basic embodiment of the present invention will be described by referring to FIG. 1. In accordance with this embodiment, a communication device that is constituted by the implementation of a communication protocol of layer n receives packets from a higher layer (n+1), such that these packets may be embedded into packets of the layer n. As already mentioned, the term "embedding" comprises both encapsulation and segmentation. It should be remarked that the entire introductory portion of the present application is incorporated into the disclosure of the invention, to thereby avoid unnecessary repetitions.

As an example, the protocol of layer n could be RLP and the packets of layer (n+1) could be PPP frames, in which case the embedding would consist in the segmentation of one PPP frame or packet into a plurality of RLP packets. It may be remarked that a PPP frame will typically have a length of 1500 byte, whereas a RLP frame will typically have a length of 30 byte. Another example would be that the protocol of layer n is PPP and the protocol of layer (n+1) is an appropriate higher layer protocol, such as one of the protocols shown in FIG. 5, in which case the embedding would be done by encapsulation.

In accordance with the invention, this embodiment has a discriminator 1 that receives the packet of layer (n+1), where said discriminator discriminates the received packet according to predetermined rules of classification. This means that the discriminator will check for certain properties of the received packet, and then classify the received packet according to the given rules. An example of this could be, in the case that the packets of layer n are PPP frames, to check the individual headers of the received PPP frame to thereby determine what type of information is being transported by said frame, and then accordingly classifying the frame. For example, if the frame is carrying LCP information, then it may be classified into the category "reliable transport", and if it is carrying UDP information, then it may be classified into the category "reliability not required".

It is clear that the above mentioned protocols and categories are only examples, and the present invention relates to all types of discriminators that are capable of classifying a received packet in accordance with its contents. As a consequence, these packets can basically be of any protocol and naturally there can be an arbitrary number of categories into which packets are classified. This number of categories can be equal to the number of transmission reliability modes that the protocol of layer n provides, but may also be lower if the protocol of layer n provides for more than two modes of transmission reliability.

The result of the discrimination, i.e. the classification is conveyed to a control means 2 that in turn controls an embedding means 3 with a transmission reliability setting command. In other words, the discriminator passes the packet to be embedded on to the embedding means 3, where it is embedded into one or more packets of layer n and the transmission reliability mode, which is appropriately set in each packet of layer n, e.g. by a corresponding flag, is set in accordance with the transmission reliability setting command.

The thus generated packets of layer n are then appropriately passed on to the next stage of processing. This next stage of processing depends on the specific application, and can therefore be chosen in any desirable or required way. For example, if the packets of layer n are intended to directly go to a next lower layer of (n−1) (not shown in FIG. 1), then it is possible that the packets of layer n will simply be passed to an input buffer of the next layer. On the other hand, if e.g. the packets are intended to be sent over an established link, then they will be preferably placed in an output buffer, which is appropriately controlled in accordance with the given situation. The precise method of flow control from such an output buffer depends on the specific application, e.g. the given protocol of layer n and on the specific link.

As can be seen from the above, the present invention is highly flexible in that it can be applied to any protocol implementation that embeds packets of one layer in packets of another and which provides for at least two different reliability modes.

Figure 2:
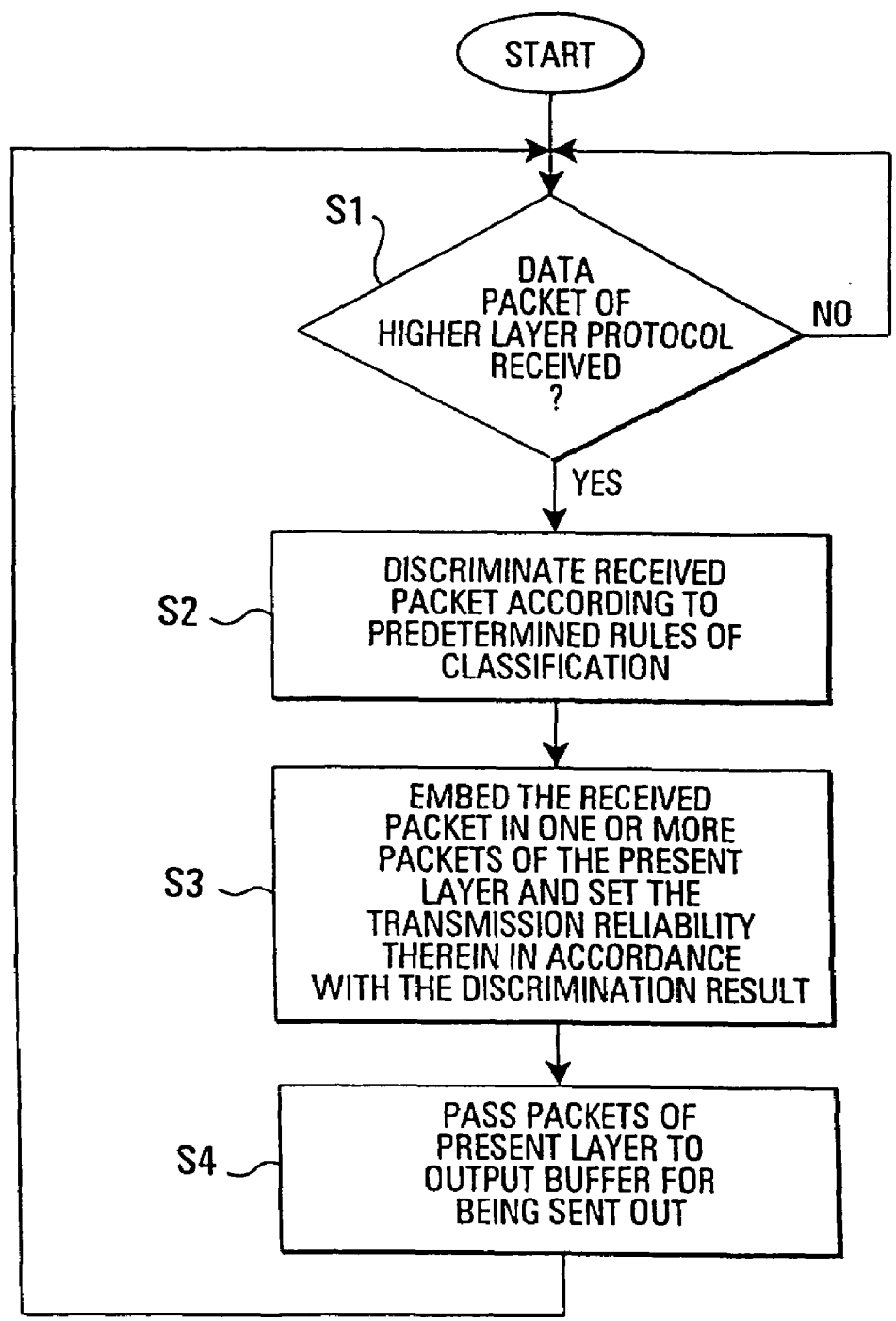
FIG. 2 is a flow chart showing an embodiment of a method according to the present invention.
Figure 8:
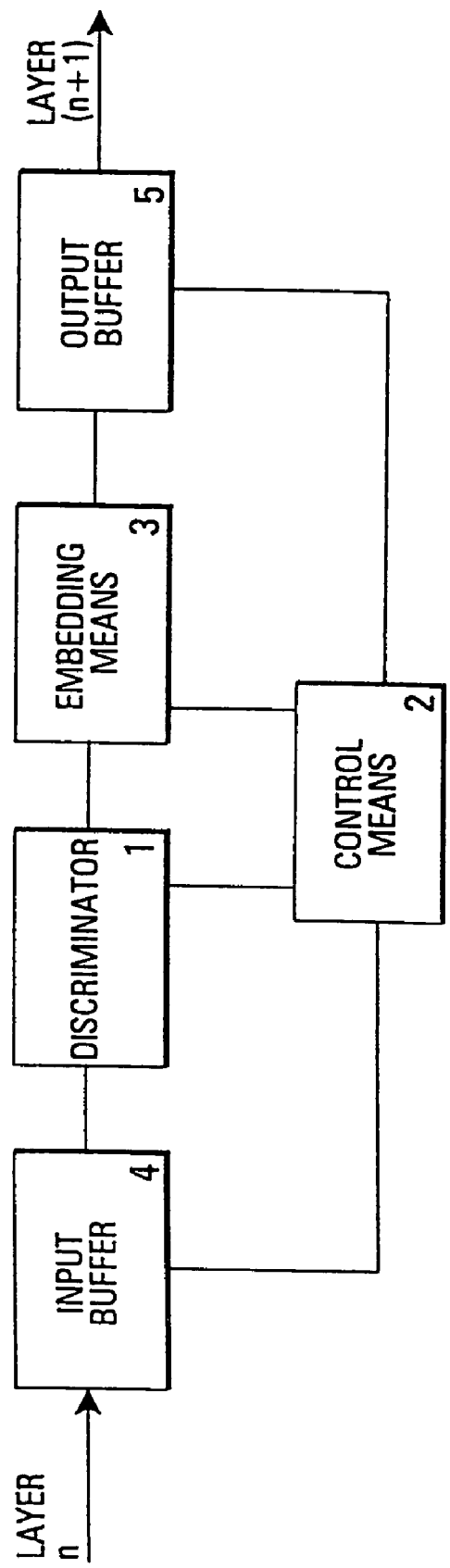
FIG. 8 is a block diagram of a preferred embodiment of the device according to the present invention.

FIG. 2 shows a flow chart that embodies the method of the present invention. In a first step S1 it is determined if a higher layer protocol packet has been received or not. If such a packet has been received, then the process proceeds to step S2, in which the received packet is discriminated according to predetermined rules of classification. Then in step S3 the received packet is embedded into one or more packets of the given layer (e.g. n in FIG. 1) and the transmission reliability mode in each of said packets is set in accordance with the discrimination result. Finally, the embedded packets are passed on to the next stage, where the process shown in FIG. 2 sends said packets to an output buffer in step S4 for being sent out. A system corresponding to what is shown in FIG. 1 and having an input and an output buffer is shown in FIG. 8. As can be seen, the device of FIG. 8 also has a discriminator 1, a control means 2 and an embedding means 3, and additionally an input buffer 4 and an output buffer 5 are shown, which are also both connected to and controlled by the control means 2. The operation is similar to that explained in connection with FIG. 1, only that the packets of layer n are provided to the discriminator 1 via the input buffer 4, where the control means 2 performs an appropriate control for letting the input buffer 4 pass packets to the discriminator 1, and in that FIG. 8 shows an example, in which the embedding means 3 passes the packets of layer n to an output buffer, which sends said packets of layer n out under control of the control means 2.

As already mentioned, the present invention is flexible in that any appropriate method of flow control can be chosen. As an example, in case there are two transmission reliability modes, such as the above described numbered and unnumbered mode, then respective packets of layer n can be placed into separate queues in the output buffer 5. In other words, if there are two transmission reliability modes that can be set in the packets of layer n, then the output buffer 5 will contain two queues. If these reliability modes are the numbered and unnumbered mode, then the output buffer will have a queue for packets of the numbered mode and a queue for packets of the unnumbered mode.

In general, one embodiment of this system shown in FIG. 8 can consist in the output buffer 5 carrying a respective queue for each transmission reliability mode into which packets are discriminated by the discriminator 1. Then the packets in the individual queues can be handled in any appropriate or desired way, e.g. there can be a predetermined priority order for the individual queues (i.e. the individual reliability modes). An example of this, in an implementation having only a numbered and an unnumbered mode, could be that there is no basic priority order between numbered and unnumbered packets for first packets to be sent (these packets are treated in a FIFO manner regardless of which queue they belong to), but that numbered packets that are to be retransmitted receive a higher priority and are consequently preferably transferred. Also in such a case, the flow control of packets from the numbered mode queue can be conducted in accordance with the known window-based flow control, whereas the flow control from the unnumbered mode queue can be done by simply sending these packets out in the appropriate order.

However, other possibilities exist equally well, as will be explained in more detail in connection with other preferred embodiments further on.

Figure 9A:
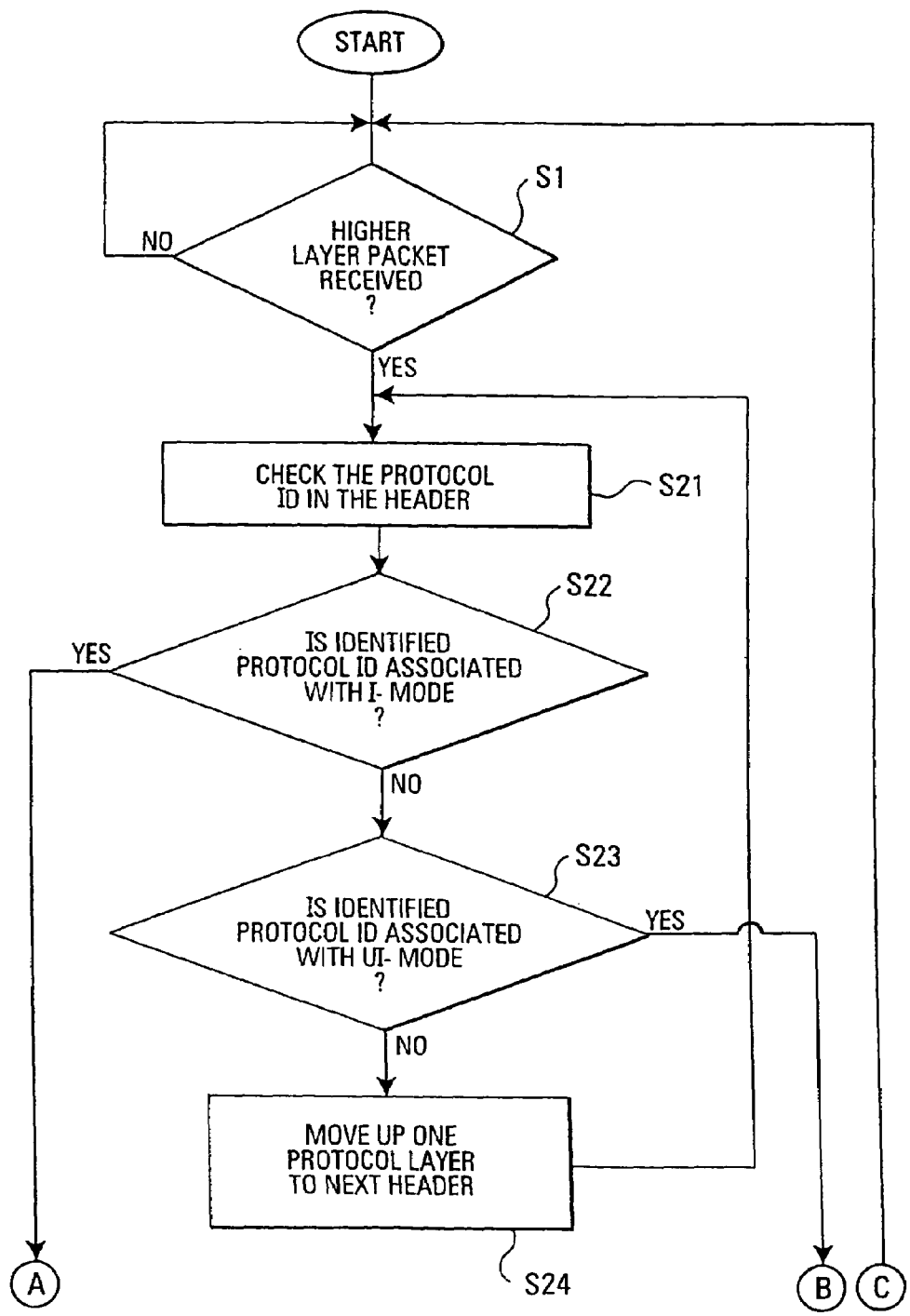
FIGS. 9a and 9b are a flow chart showing a preferred embodiment of the method of the present invention.
Figure 9B:
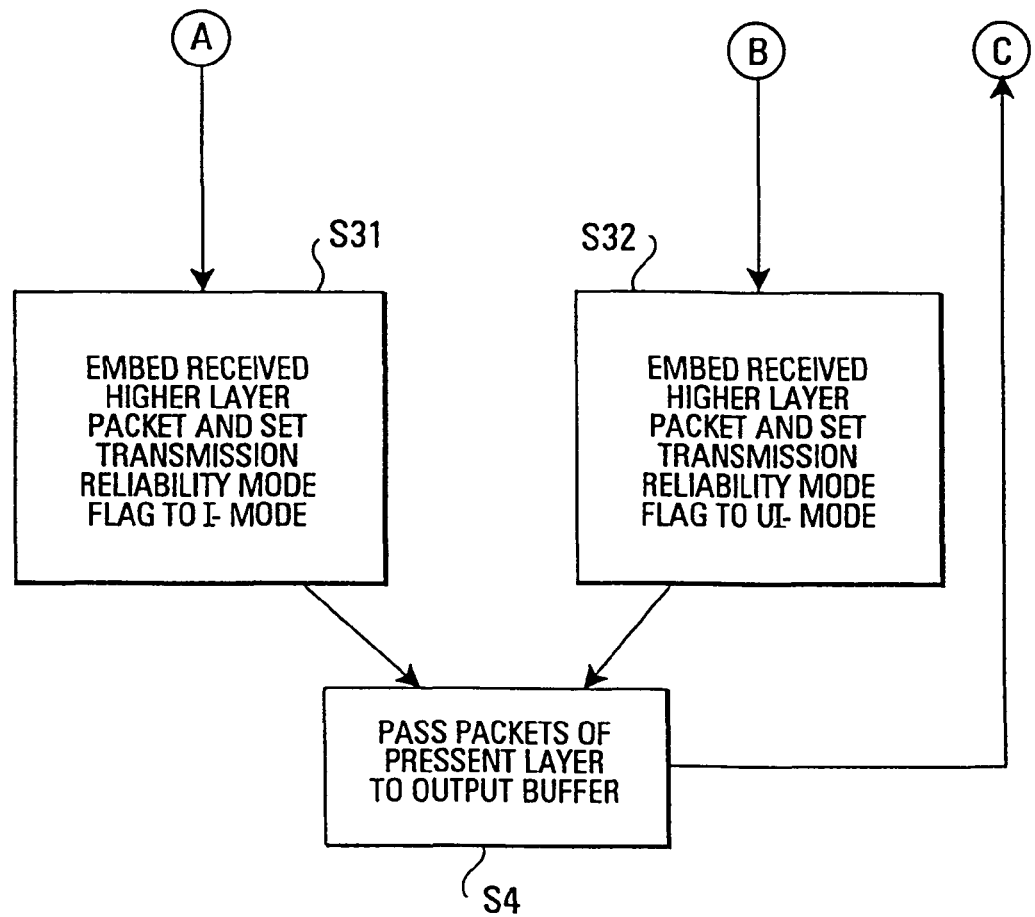

A preferred embodiment for the method of the present invention is shown in FIGS. 9a and 9b. Steps corresponding to those already discussed in connection with FIG. 2 carry the same reference numerals. The method shown in FIGS. 9a and 9b relates to a case in which the invention is applied to the implementation of a protocol, where said protocol provides a numbered reliability mode (I-mode) and an unnumbered reliability mode (UI-mode). In other words, in the numbered mode, packets are retransmitted if they are not correctly received by the receiving peer, where the correct receipt is conveyed to the sending peer by means of acknowledgment packages, and the unnumbered mode does not provide for retransmission.

Figure 5:
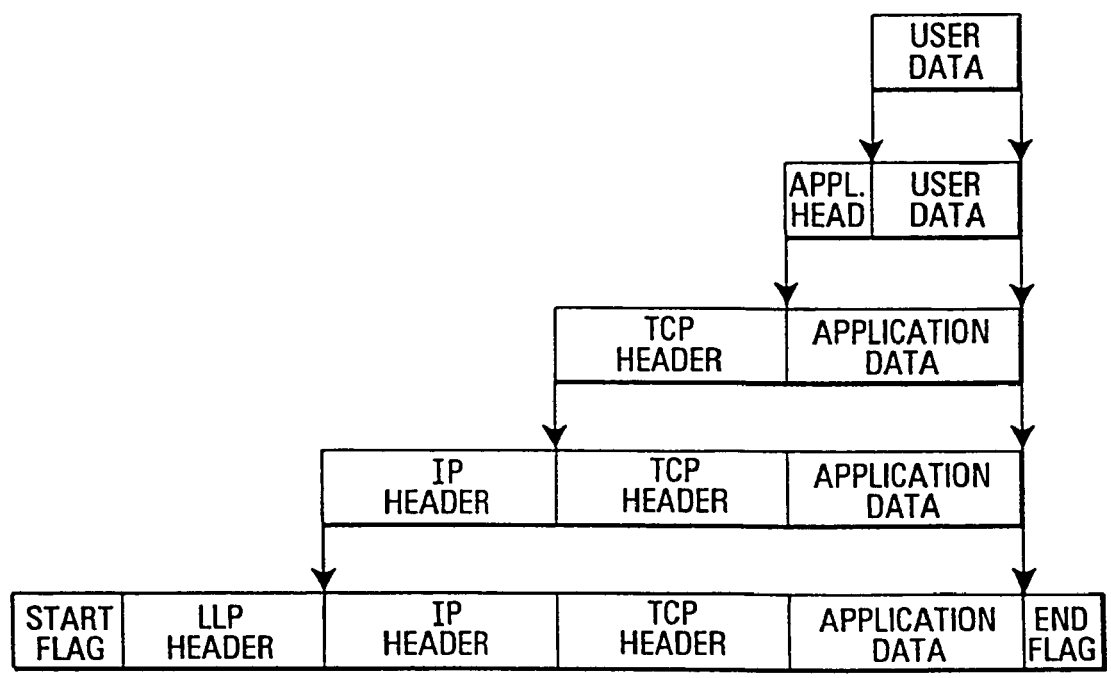
FIG. 5 is a schematic diagram showing the concept of encapsulation in the subsequent protocol layers of FIG. 3 and FIG. 4.

In FIG. 9, steps equal or equivalent to those described in conjunction with FIG. 2 carry the same reference sign. In a first step S1 it is determined if a higher layer packet has been received. If yes, then the process proceeds to step S21, in which the protocol ID in the header of the received higher layer packet is analyzed. For example, if the higher layer packet received is a PPP frame as shown at the bottom of FIG. 5, then the process will simply check the PPP header directly following the start flag. Then, in step S22 it is determined if the identified protocol ID is associated with the numbered mode, said association being given by the above mentioned predetermined rules. For example, in the case of PPP packets, it is preferable if said rules state that LCP packets be put into the numbered mode, because such LCP packets are part of the link set-up procedure where a high amount of reliability is necessary. Consequently, if in step S22 the process determines that LCP information is being transported, then the procedure branches to step S31, in which the received higher layer packet is embedded into one or more packets of the layer at which the present invention is implemented, where the reliability mode in each of said one or more packets is set to the numbered mode, e.g. by setting the corresponding reliability mode flag in each packet.

If in step S22 it is determined that the identified protocol ID is not associated with the numbered mode, then step S23 determines if the identified protocol ID is associated with the unnumbered mode. If this is the case, then the process proceeds to step S32, in which the received higher layer packet is embedded into one or more packets of the layer at which the present invention is implemented, and the reliability mode in each of said one or more packets is set to the unnumbered mode, e.g. by setting the appropriate flag. If both steps S22 and S23 lead to a negative result, then step S24 specifies that the check proceed up one protocol layer in the received packet, such that the next header be checked. When again looking at the example at the bottom of FIG. 5, this would be the IP header carrying a protocol ID distinguishing TCP, UDP and ICMP data. The process then repeats the steps S21 to S24. If the determined protocol ID can again not be allocated to either the numbered mode or the unnumbered mode, then the process again goes up one protocol layer, e.g. in the example of FIG. 5 to the TCP header.

In general, the association between given protocol packets and the numbered mode or unnumbered mode will be stored in a table that is looked up during the decision steps S22 and S23. Ideally it should be such that all possible protocols are stored in said table, so that any received packet can eventually be classified into the numbered mode or unnumbered mode. However, for reasons of economy, it is equally well possible to implement a fail-safe mechanism into the process shown in FIGS. 9a and 9b, e.g. a counter in step S24 that only allows a moving up to a next protocol layer for a predetermined number of times, where the exceeding of said predetermined number of times leads to a default mode being assigned to the received packet in question. This default mode can be either the numbered mode or the unnumbered mode. Naturally, other fail-safe mechanisms are possible, and can be chosen in any desired or required way.

Returning to FIG. 9b, after step S31 or S32, the process proceeds to step S4, in which the packets are passed to the output buffer, just as in the case of FIG. 2. The process then turns to step S1 to wait for the next higher layer packet to be received.

In a general way, the method of FIG. 9 embodies a system in which the data packets have one or more sections carrying information on the contents of the packet (e.g. a packet encapsulating a hierarchy of protocols), and the discriminator means is arranged to analyze said one or more sections to thereby discriminate the data packets in accordance with their contents. More specifically, said one or more sections are packet headers associated with respective protocol layers and containing protocol identification information identifying the protocol with which the contents of the packet are associated. The packet headers form a hierarchy in accordance with the protocol layers, and, for a packet to be discriminated, the discriminator is arranged to first determine the protocol identification in the header associated with the first higher layer protocol and then compare said protocol identification with stored rules that allocate a predetermined transmission reliability mode to predetermined protocol identifications. Furthermore, the discriminator is arranged to set the transmission reliability mode for said packet to be discriminated in accordance with a determined allocation if said protocol identification is among the stored rules, and if said protocol identification is not among the stored rules, then determine the protocol identification in the header associated with the next protocol one layer up in the hierarchy and then compare said protocol identification of said next protocol with said stored rules that allocate a predetermined transmission reliability mode, where the process of determining and comparing is repeated until either a determined protocol identification in said packet to be discriminated is allocated to a predetermined transmission reliability mode according to one of the rules, in which case said transmission reliability mode is set for said packet to be discriminated, or a fail-safe condition is met, in which case a default transmission reliability mode is set for said packet to be discriminated.

Preferably, the present invention is applied to the implementation of protocols that use segmentation for embedding higher layer packets into the packets to be sent over a link, and said protocols support two transmission reliability modes, namely a numbered mode and an unnumbered mode. Examples of such protocols are protocols for handling communication over radio links, such as the above mentioned RLP and RLC.

The application of the present invention to such protocols is preferably done in accordance with the embodiments shown in FIGS. 8 and 9.

Preferably in such a case, the invention then not only has specific features for embedding packets to be sent, but also comprises specific features relating to the receipt of such embedded link layer protocols from a sending peer, i.e. features that relate to the implementations properties as a receiving peer.

In the following, a number of basic mechanisms for a peer of a link layer protocol acting as both a sender and a receiver will be explained with the help of an example using RLP as a link layer protocol embedding PPP frames by means of segmentation. It should however be remarked that these protocols are only examples for the purpose of explanation, such that the described mechanisms may be put to practice with any other appropriate protocol.

According to a basic mechanism, the RLP sender analyses the data stream being passed to it from a higher layer, e.g. the PPP frames, to determine in which mode each higher layer frame is to be sent, i.e. in the numbered mode or unnumbered mode. This process will be done as described in connection with FIGS. 8 and 9, such that a repetition is not necessary here. The flow control of packets from the output buffer is performed such that RLP packets in the numbered mode and unnumbered mode are sent out on a FIFO basis with respect to the first sending (of numbered mode packets, because unnumbered mode packets are always only sent once), but RLP packets of the numbered mode that are to be retransmitted have a higher priority and are therefore always sent as soon as possible.

The RLP receiver separates the packets of the unnumbered mode and numbered mode into respective and distinct buffers or at least distinct queues. Like the RLP sender, the RLP receiver always analyses the data in each buffer to thereby discriminate higher layer frames. Only once a complete higher layer frame has been received, will it be released to the higher layer on the receiving side. A problem may occur for packets sent in the unnumbered mode, because in such packets the delimiter (e.g. start or end flag) for the higher layer packet may get corrupted during the transmission, as no retransmission takes place. For this case the RLP receiver is adapted to employ a fixed buffer limit for packets of the unnumbered mode, beyond which packets of the unnumbered mode will be released to the next higher layer regardless if a delimiter has been received or not. More specifically, after the fixed buffer limit is exceeded, the RLP receiver will release every RLP packet of the unnumbered mode to the next higher layer until another higher layer packet delimiter has been detected. Using said higher layer packet delimiter as a new starting point, the RLP receiver can then again wait for the next higher layer packet delimiter, i.e. until the next complete higher layer packet has been received.

Another mechanism for enabling the RLP receiver to distinguish the individual higher layer packets is to have the RLP sender duplicate every higher layer delimiter it detects in the data that it sends out. In other words, in addition to discriminating the data in accordance with its contents, the RLP sender will also look for the delimiters of the next higher layer, e.g. PPP, and always insert an identical delimiter next to each delimiter it detects. It is advantageous if the above mentioned process in response to a fixed buffer limit being exceeded is retained in the receiving features of the RLP implementation, i.e. if the feature of delimiter duplication by the implementation of the sender is combined with buffer limit feature relating to the implementation of the sender.

Another mechanism relating to both the sending and receiving features of an RLP implementation will now be discussed. The sender features are again as described above, namely the sender analyses the data stream it receives to determine in which mode each higher layer frame is to be sent, i.e. in the numbered mode or unnumbered mode. Flow control from the output buffer is conducted in such a way that retransmitted numbered mode packets always have a higher priority. Regarding the receiving features of the RLP implementation, the receiver is able to separate the numbered mode and unnumbered mode packets it receives into distinct buffers or queues, just as in the previously explained case. Now, the receiver only analyses numbered mode packets to discriminate higher layer packets (e.g. PPP frames). In general, the receiver immediately releases numbered mode and unnumbered mode packets to the higher layer, with the usual restriction that numbered mode data can only be released in the correct order. In other words, this means that the receiving buffer will usually not hold the received packets but much rather immediately release them, except for numbered mode packets for which retransmission is taking place, because then a certain amount of these numbered packets have to be buffered, because they can only be released in the correct order to the higher layer. Another exception is explained in the following.

With this rule concerning how the receiver releases packets to the higher layer on its side, four cases may be distinguished:

(a) only unnumbered mode packets are being transmitted (for example the sender is only sending UDP packets, which may be referred to as a UDP session), where no problem occurs in this case;

(b) only numbered mode packets are being transmitted (for example the sender is only sending TCP packets, which can also be referred to as a TCP session), where again no problem occurs;

(c) unnumbered mode packets followed by numbered mode packets are being transmitted (for example a UDP session followed by a TCP session), where again no problem occurs; and (d) numbered mode packets followed by unnumbered mode packets are being transmitted (for example a TCP session followed by a UDP session, or a UDP and TCP session that run in parallel), where a problem can occur, if numbered mode packets have to be retransmitted and unnumbered mode packets are being received in the meantime.

To solve this problem of case (d), the following mechanism may be used. As long as the higher layer packet which was sent in the numbered mode has not been completely received (e.g. because the packet which contains the PPP frame delimiter marking the end of a TCP packet has to be retransmitted) the unnumbered mode packets have to be buffered. The buffer will not be released to the higher layer before the whole numbered mode packet has been received and released. After the numbered mode packet has been completely received and released to the next higher layer, the contents of the buffer containing unnumbered mode packets is released. Then normal operation continues.

According to a preferred embodiment of the above mentioned mechanism, the receiver additionally has knowledge or information on which packet delimiter is being used. The default delimiter should be the delimiter of the usual packets of the next higher layer (e.g. the PPP frame delimiter), but if another delimiter shall be used, this can be negotiated between the two link layer entities, i.e. the two RLP peers. This in other words means that other protocol packets of the next higher layer could be processed, i.e. those of more than one protocol. In the context of the above example relating to PPP frames being embedded in RLP packets, this means that the RLP implementation could then not only embed PPP frames but frames of other protocols as well, where said other protocols belong to the same layer as PPP. There are a variety of possibilities of how the receiver can obtain this information. In the case of link layer protocols based on HDLC (such as GSM RLP) using a special signaling frame or XID frame, which is a standard HDLC frame for link parameter negotiation, said XID frame having a new parameter can be used.

Another mechanism, which only relates to the sending features, will now be described. In other words, the receiver implementation will not be changed in any way. Thus, the receiver will always release unnumbered mode packets when received and the delivery of numbered mode packets is as usual released in order. Therefore it is up to the sender to make sure that the higher layer packets (e.g. PPP frames) will be released correctly at the receiver. This can be done in such a way that before the sender starts an unnumbered mode session, no unacknowledged numbered mode packet is allowed to be outstanding, i.e. all numbered mode packets have to be acknowledged by the receiver. Although this mechanism is simpler to implement, as it does not change the receiving features, it results in an extra delay introduced when switching between a numbered mode session and an unnumbered mode session.

Finally, another mechanism could consist in controlling the output buffer of the sender in such a way that when an unnumbered mode session is being run by the sender, all unnumbered mode packets to be sent should be sent in consecutive RLP frames carrying the unnumbered flag.

As already mentioned previously, the above described mechanisms have been explained by using RLP and PPP as preferred examples, but these mechanisms are naturally not restricted to these protocols. Much rather they can be implemented for any protocols having the suitable features.

In the above embodiments, the invention was described with regard to discriminating with respect to a specific field in the packet header of a packet being embedded, namely the protocol ID field of higher layers, and with respect to the specific transmission scheme of ARQ-based error recovery, using the two operating modes relating to reliability, namely the numbered mode and the unnumbered mode. The invention is by no means restricted thereto.

Much rather, the invention may equally well be applied to discriminating with respect to any packet content in any part of a packet, such as also the above mentioned DS field or IP option. Regarding the operating modes associated with ARQ, naturally more than two may be employed, such as e.g. the already mentioned numbered and unnumbered mode supplemented by a mixed mode.

The present invention is also not restricted with respect to the transmission scheme of ARQ, i.e. error recovery, but may also be applied to any operating modes associated with any type of forward error correction. More specifically, the present invention is applicable to all transmission schemes which have at least two different operating modes, such as the transmission scheme of FCS-based error detection (FCS=Frame Check Sequence) with the operating modes of e.g. the receiver discarding erroneous frames, the receiver marking but not discarding erroneous frames, and the receiver neither marking nor discarding erroneous frames, where the discriminating operation may naturally be made in view of any two of the modes or all three. Or the invention is applicable to the transmission scheme of FEC-based error correction (FEC=Forward Error Control) with the operating modes of e.g. using one of two or more FEC schemes. Or the invention is applicable to the transmission scheme of interleaving-based error prevention with the operating modes of e.g. using one of two or more interleaving schemes. Or the invention is applicable to the transmission scheme of power control with the operating modes of e.g. using one of two or more power levels. Or the invention is applicable to the transmission scheme spreading-based error prevention (in spread-spectrum technologies such as CDMA) with the operating modes of e.g. using one of two or more spreading factors. Or the invention is applicable to the transmission scheme of frame length control with the operating modes of using e.g. one of two or more possible frame lengths. Or the invention is applicable to the transmission scheme of bandwidth reservation control with the appropriate operating modes such as the allocation of 1, 2, 3, . . . or 8 time slots e.g. in the GPRS communication standard.

Naturally, all of these transmission schemes and operating modes may be combined in any arbitrary and suitable way. This means that the discriminating may be conducted in view of generalized operating modes that consist e.g. of a combination of ARQ-related mode and power control related mode, such for example the numbered mode, the unnumbered mode, and 4 power levels are combined to achieve 8 modes, i.e. (I-mode, power level 1), (I-mode, power level 2), . . . , (UI-mode, power level 4). As already mentioned, arbitrary combinations are possible, as is best suited for the specific application.

Now a further preferred embodiment of the invention will be described in connection with FIG. 10. According to this preferred embodiment, the present invention is applied to provide a way of transmitting packets at a lower layer in accordance with transmission quality requests such as QoS (Quality of Service) requirements and/or transmission priorities specified by peers of a higher layer, where the packets or data units of said higher layer are embedded at said lower layer.

Figure 3:
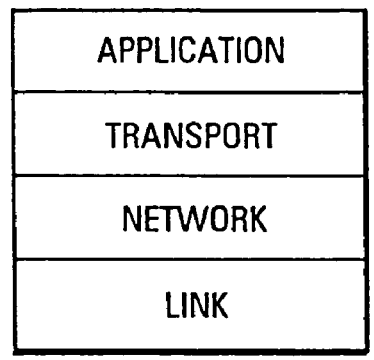
FIG. 3 is a schematic diagram for explaining the concept of protocol layering in terms of the example of the TCP/IP suite.
Figure 4:
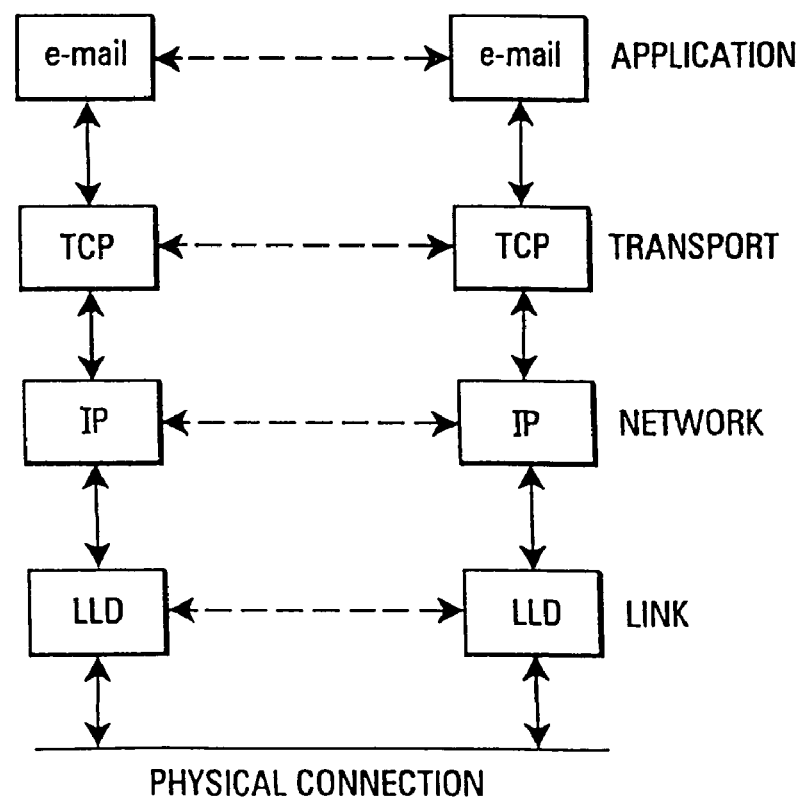
FIG. 4 is a schematic diagram for explaining the flow of packets through the layers shown in FIG. 3.
Figure 6:
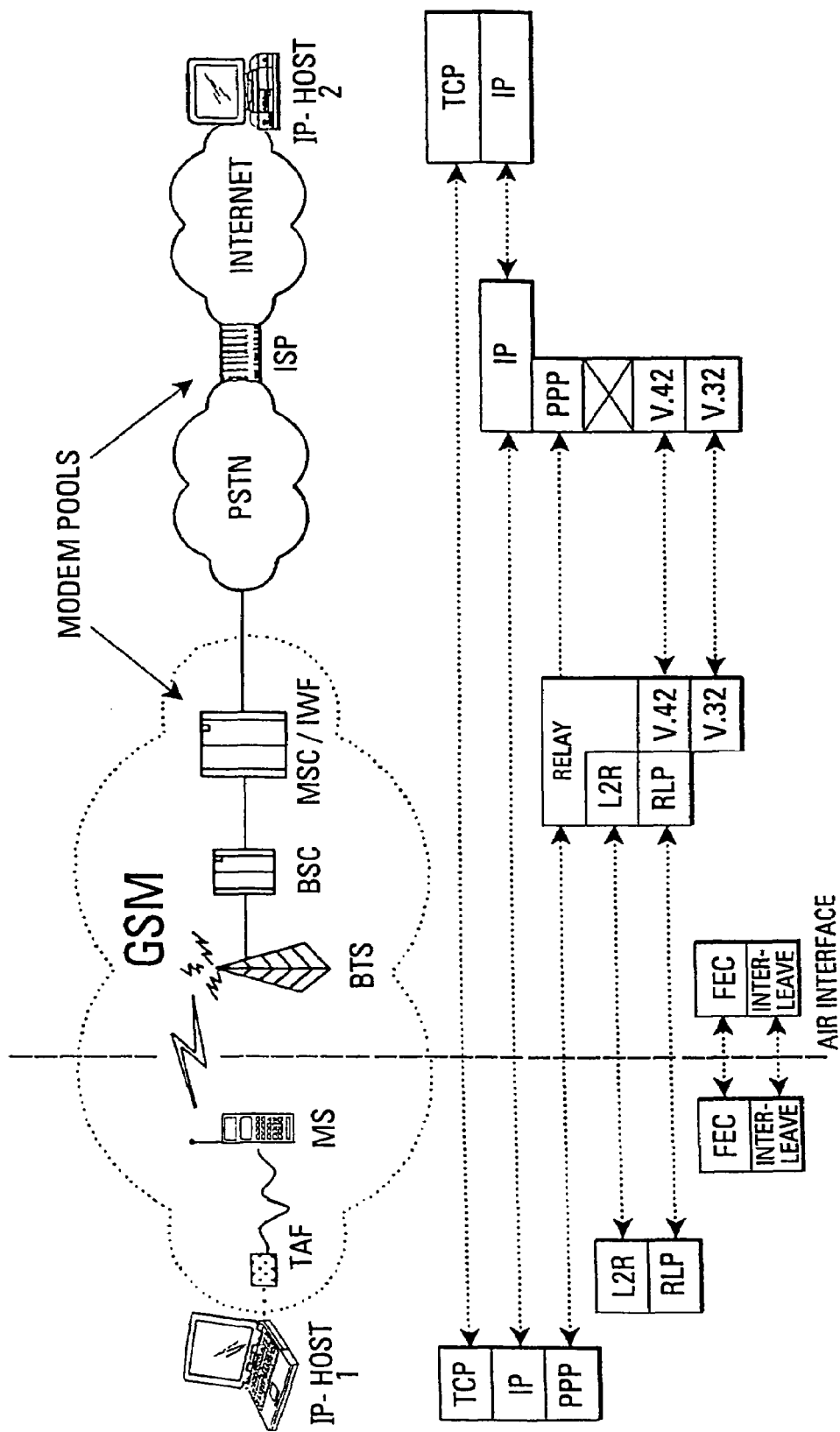
FIG. 6 shows a schematic example of a connection between two IP-hosts over a circuit-switched GSM link, and the corresponding hierarchy of layers and protocols.
Figure 7:
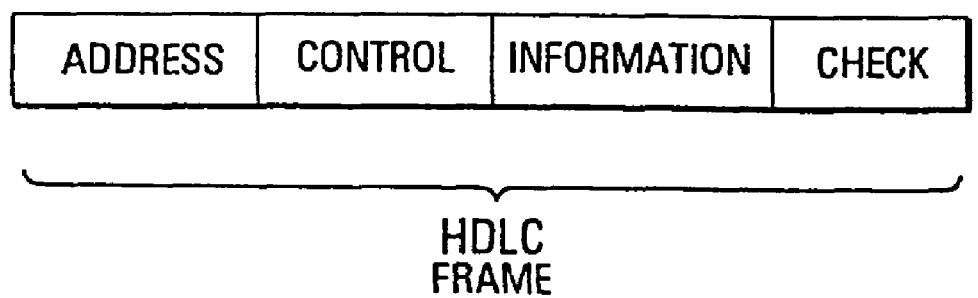
FIG. 7 shows the basic structure of a HDLC frame.

In the following description the term L3 will be used to refer to a network layer protocol, e.g. IPv4 or IPv6, also see FIG. 3. The L3 protocol data unit (PDU) will be referred to as a packet, and the PDU header as a packet header. The term L1/L2 will be used to refer to a protocol or a set of two or more protocols below L3, such as the physical and/or the link layer of a specific network, again see FIG. 3. The term bearer will be used for an L1/L2 with either fixed settings for all L1/L2 operating modes or fixed QoS (Quality of Service) settings to which all L1/L2 operating modes are dynamically adapted depending on the momentary conditions of the medium underlying L1/L2 (e.g. radio). The term peers will be used as above, i.e. as relating to processes that communicate according to a common protocol of a certain layer. Examples are a WWW client and server communicating according to the HTTP protocol on the application layer, or a TCP sender and receiver on the transport layer, also see FIG. 6. In the following context, the term peer will always refer to peers which communicate according to protocols which are directly or indirectly based on L3. The term flow will refer to a single instance of peer-to-peer L3-packet-based (packet-switched) traffic which is identified by source address, source port, destination address, destination port and protocol ID. In other words, a flow is a uniquely identifiable stream of packets. Each flow is considered as having certain QoS requirements. QoS requirements may vary over time.

It may be noted that when it is said that a peer (e.g. a legacy WWW browser) chooses the QoS requirements for its flow, this also comprises that some other process does this on behalf of the peer.

Figure 10:
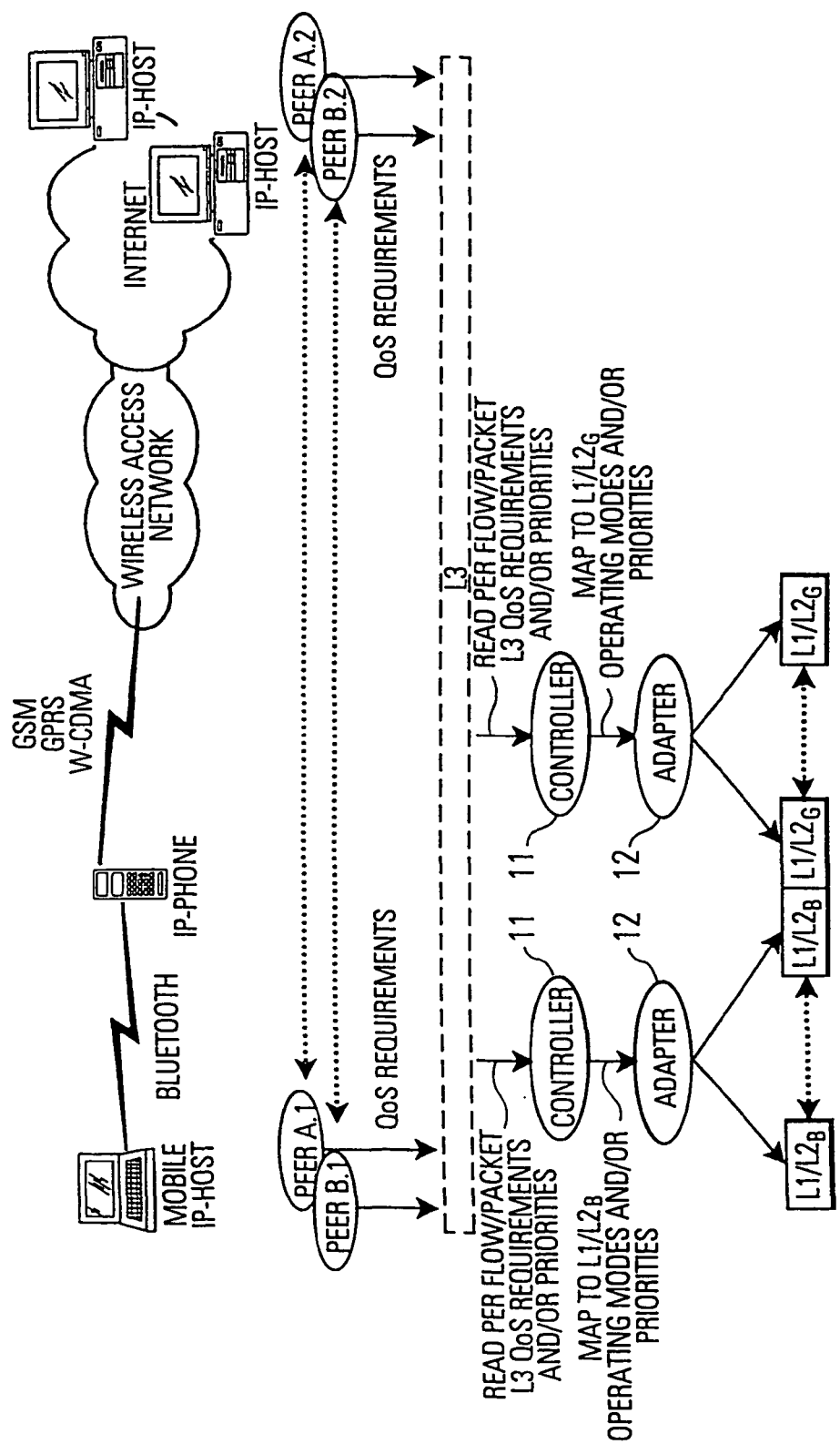
FIG. 10 shows a communication arrangement for explaining another preferred embodiment of the invention.

FIG. 10 shows a communication between a mobile IP-host suitably linked (in FIG. 10 over a so called bluetooth link) to a mobile telephone adapted to transport IP packets. The telephone in turn can establish a radio link with a wireless access network, where any suitable communication standard can be used, such as e.g. GSM, GPRS or W-CDMA. The wireless access network is connected to the Internet, which comprises a multitude of hosts, two of which are shown in FIG. 10.

The lower part of the figure schematically shows the communication situation. Peers A.1 and B.1 are shown as examples on the mobile side, and peers A.2 and B.2 as their respective counterparts. These peers may pass QoS requirements and/or transmission priorities, i.e. in general quality requests as control information, to the L3 layer. The peers are either L3 peers or of protocol layers above L3. This can be done by specifying a given field in the L3 header as relating to quality requests, such that the L3 layer is used as a level through which peers express their QoS requirements and/or priorities on a per flow or per packet basis.

The discrimination of L3 packets is handled by a controller or controlling process 11 at each side of L1/L2, which in turn controls an adapter or adaptation process 12 in response to the discrimination result. The controlling process 11 "reads" the per packet QoS requirements and/or priorities and maps them to respective L1/L2 operating modes and/or priorities of that network. The adaptation process 12 is capable of adapting the L1/L2 operating modes on a per packet basis and makes this decision at least in part dependent on the information provided by the controller. Typically, the adaptation of the L1/L2 operating modes will also be conducted on the basis of measured conditions of the medium underlying L1/L2.

As a consequence, the present embodiment comprises dynamically adapting L1/L2, where L1/L2 is adaptable on a per packet basis, and having a control process which has access to the per flow/packet QoS requirements and/or priorities and which can use those to control the adaptation process and/or the L1/L2 scheduler(s) accordingly.

As an example, the optimal adaptation of L1/L2 for TCP would use ARQ-based error recovery in I-mode and other transmission schemes, e.g. FEC to be optimized for highest throughput. On reading the protocol ID field (which says that it is a TCP flow) in the packet header, the controller can make the appropriate decision, e.g. for a mobile-terminated TCP flow. The optimal adaptation for a real-time VoiceOverIP flow (e.g. broadcast radio which does not have a session initiation protocol) would use no ARQ-based error recovery (UI-mode) and other transmission schemes, e.g. FEC to be optimized to the source transmission rate and lowest residual error. On reading the DS field in the packet header, the controller can make the appropriate decision, e.g. for a mobile-terminated real-time VoiceOverIP flow.

The above described embodiment solves a problem of known L1/L2 protocol implementations. L1/L2 of state-of-the-art networks (e.g. wireless networks) have to simultaneously transport different flows each potentially having different QoS requirements. However, L1/L2 of state-of-the-art networks cannot be adapted down to the level of exactly meeting the QoS requirements of individual flows, and also not one step further down to the level of meeting the QoS requirements of individual packets of a flow. The latter could e.g. be required for flows which have QoS requirements that vary over time so that different packets of the same flow have different QoS requirements. Instead, state-of-the-art networks can at most only support one or more bearers simultaneously. However, the way that flows are mapped onto those bearers is not directly related to the QoS requirements of those flows but is based on criteria like priorities, which e.g. correspond to network operator charges per packet (as e.g. done in the GPRS communication system). The resulting problem is that either the QoS requirements of some Flows/packets are not met, or the QoS requirements of some flows/packets are met but only in a non-optimal way (e.g. the FEC scheme chosen for a TCP window flow is too strong providing a lower bit rate than could have been provided with the optimal FEC scheme), or the QoS requirements of some flows/packets are exceeded, which corresponds to wasted network resources (e.g. spectrum or transmission power).

It should be noted that the adaptation of L1/L2 to the QoS requirements of flows is independent of the concept of priority-based traffic scheduling. For example, a real-time voice stream will have specific QoS requirements independent of whether it is assigned to the best-effort or some kind of predictive QoS traffic class.

The present embodiment solves this problem by dynamically adapting L1/L2 to the QoS requirements of each flow or packet. It provides the following functionalities and their interworking:

functionality 1: a standardized scheme through which the QoS requirements for individual flows/packets can be uniquely specified so that the semantics are the same in any network supporting that scheme;

functionality 2: an adaptation process which can adapt L1/L2 according to operating modes provided by a control process. The operation modes can either be provided explicitly or implicitly in a form that only has local semantics, e.g. with respect to QoS which are specific for the network of that L1/L2. The adaptation process can combine the operating modes provided by the control process with measurement information about conditions of the medium (e.g. radio) underlying L1/L2 to eventually decide on the final operating mode. This is however only an implementation detail;

functionality 3: a control process which is capable of controlling the adaptation process on a per flow/packet basis given the QoS requirements of each flow/packet by having access to the control channel; and functionality 4: a control channel through which the per flow/packet QoS requirements can be made available to the control process.

It may be noted that the adaptation and the control process each can either be distributed processes, e.g. one process per L1/L2 transmission scheme, or a single process adapting/controlling all L1/L2 transmission schemes. This is again an implementation detail. It may also be noted that the above described functionalities require an L1/L2 which can be adapted on a per packet basis or at least on a per packet sequence basis, e.g. it must be possible to change the FEC from one packet to the other or at least from one sequence of packets to the other.

Regarding what is known from the state of the art of RfC 2475, it must specifically be remarked that RfC 2475 does not hint at dynamically adapting L1/L2. Moreover, it is not known from the prior art to implement L1/L2 to be adaptive with respect to QoS requirements of individual packets/flows (functionality 2), and it is not known to provide the control process of functionality 3.

Using the communication systems of GSM-CSD or GPRS as examples of state-of-the-art networks, a number of scenarios may be given for showing that both networks are missing functionalities to support per flow/packet adaptation.

Taking the arrangement of peers A.1, B.1, A.2 and B.2 from FIG. 10 as an example (i.e. without the features of the invention), then, in a conventional network, peers that are physically close (e.g. A.1 and B.1) to L1/L2 in GSM-CSD and GPRS have a direct control channel to adapt that L1/L2 according to QoS which are explicitly known to that peer (or a process that acts on its behalf). For example peers A.1 and B.1 could have access on an AT command interpreter through which it can be chosen to run a reliable link layer protocol (RLP) or not to do so (transparent or non-transparent mode). Using RLP would e.g. be optimal for a TCP flow. On the other hand peers A.2 and B.2 would have no way of adapting different L1/L2s for a TCP-flow they initiate. There is also no control process (functionality 3) which could perform the adaptation on behalf of peer A.2 and/or B.2.

GSM-CSD is only capable of operating according to fixed modes (e.g. FEC scheme x and I-mode error recovery) for the duration of the circuit switched call, although several flows with potentially different QoS requirements may have to be transported simultaneously.

It should be remarked that although the invention has been described with reference to specific embodiments, this should not be seen as restricting the invention to these embodiments, as these have been presented for the sake of clarity and completeness, but the invention is to be seen as defined by the appended claims. Reference signs in the claims serve to make the claims more readily understandable and do not limit the scope.

What is claimed is:

1. A communication device for generating and transmitting data packets having a first data structure determined by a first protocol, said communication device comprising:
   means for receiving data packets having a second data structure determined by a second protocol, wherein the first protocol is at a first layer in a protocol suite, and the second protocol is at a second, higher layer in the protocol suite, and the first layer is higher than a third layer in the protocol suite;
   means for discriminating between a first type and a second type of received data packets by accessing a predetermined field in the received data packets in which the type of data packet is indicated;
   means for generating data packets having the first data structure by embedding the data packets having the second data structure in at least one of the data packets having the first data structure; and
   transmission means for transmitting the generated data packets to a receiving entity, said transmission means including in each of the transmitted data packets, an indication of the type of data packet, wherein the transmission means transmits the generated data packets to a receiving entity in the third layer of the protocol suite.

2. A communication device for generating and transmitting data packets having a first data structure determined by a first protocol, said communication device comprising:
   means for receiving data packets having a second data structure determined by a second protocol;
   means for discriminating between a first type and a second type of received data packets by accessing a predetermined field in the received data packets in which the type of data packet is indicated;
   means for generating data packets having the first data structure by embedding the data packets having the second data structure in at least one of the data packets having the first data structure; and
   transmission means for transmitting the generated data packets to a receiving entity, said transmission means including in each of the transmitted data packets, an indication of the type of data packet;
   wherein the first protocol is a transmission protocol, and the transmission means transmits the generated data packets to a receiving entity over a communication link; and
   wherein the transmission means utilizes a first transmission reliability mode for transmitting data packets having the first type of data packets embedded therein, and utilizes a second transmission reliability mode for transmitting data packets having the second type of data packets embedded therein.

3. A communication device for generating and transmitting data packets having a first data structure determined by a first protocol, said communication device comprising:
   means for receiving data packets having a second data structure determined by a second protocol;
   means for discriminating between a first type and a second type of received data packets by accessing a predetermined field in the received data packets in which the type of data packet is indicated, wherein the means for discriminating between a first type and a second type of received data packets accesses a field in each received data packet that indicates a transmission protocol to be utilized to transmit the received packet, and discriminates between the first and second types of received data packets in accordance with the indicated transmission protocol;

means for generating data packets having the first data structure by embedding the data packets having the second data structure in at least one of the data packets having the first data structure; and transmission means for transmitting the generated data packets to a receiving entity, said transmission means placing in each of the transmitted data packets, an indication of the type of data packet, wherein the transmission means includes:

means for associating each indicated transmission protocol with a transmission reliability mode; and means for transmitting the data packets with the associated transmission reliability mode.

4. A communication device for generating data packets having a first data structure determined by a first protocol, said communication device comprising: means for receiving data packets having a second data structure determined by a second protocol; means for discriminating between a first type and a second type of received data packets according to predetermined rules based on the contents of the received data packets; means for generating data packets having the first data structure by embedding the data packets having the second data structure in at least one of the data packets having the first data structure; and means for adjusting an operation mode to match the type of received data packet, wherein the operation mode provides a requested transmission quality or level of security.

5. The communication device of claim 4, wherein the means for adjusting the operation mode is adapted to adjust a forward error correction mode that includes one or more of frame check sequence based error detection, forward error control based error correction, interleaving-based error prevention, power control, spreading-based error prevention, frame length control, and bandwidth reservation control.

6. The communication device of claim 4, wherein the data packets of the second structure carry quality requests, and the discriminating means is adapted to discriminate between the data packets of the second data structure on the basis of the quality requests.

7. The communication device of claim 6, wherein the means for adjusting the operation mode is adapted to adjust one or more of a transmission quality, transmission priority, and quality of service for at least one of the data packets of the first data structure on the basis of a discriminated quality request.

8. The communication device of claim 4, wherein the means for adjusting the operation mode is adapted to adjust the operation mode to be compliant with requirements of a communication link over which the data packets of the first structure are to be sent.

9. The communication device of claim 4, further comprising an output buffer having a plurality of separate queues for storing the data packets of the first data structure, wherein each separate queue is associated with one of a plurality of predetermined operation modes, wherein the means for adjusting the operation mode is adapted to select an operation mode for each of the data packets of the first data structure from among the plurality of predetermined modes, and to place each of the data packets of the first data structure into an associated queue in the output buffer.

10. The communication device of claim 9, wherein the separate queues are associated with a predetermined priority order with respect to a transfer of the data packets of the first data structure.

11. The communication device of claim 10, wherein a first queue is associated with a numbered mode and a second queue is associated with an unnumbered mode, and data packets stored in the first queue that are to be retransmitted receive a higher transmission priority than data packets stored in the second queue.

12. The communication device of claim 4, wherein the contents of the data packets of the second data structure form a hierarchy, and the discriminating means includes:

means for determining identification information for a given data packet of the second data structure;

means for comparing the identification information with stored rules that allocate a predetermined operation mode to predetermined identification information;

means for setting the operation mode for the given data packet in accordance with a determined allocation, if the identification information is among the stored rules; and means for determining in the contents of the given data packet, higher level identification information associated with a next level in the hierarchy and then comparing the identification information of the next level with the stored rules, if the identification information is not among the stored rules;

wherein the discriminating means continues to determine identification information at sequentially higher levels in the given data packet and to compare the identification information with the stored rules until either the identification information is among the stored rules and the operation mode for the given data packet is set in accordance with a determined allocation, or a fail-safe condition is met and a default operation mode for the given data packet is set.

13. The communication device of claim 4, wherein the first protocol specifies performing segmentation in order to embed the data packets of the second data structure in the data packets of the first structure.

14. The communication device of claim 13, wherein the discriminating means also includes means for detecting a packet delimiter belonging to a data packet of the second data structure in data packets of the second data structure that are to be embedded, and to duplicate the packet delimiter prior to embedding.

15. The communication device of claim 13, wherein the first protocol is a protocol for sending data packets over a link, and a retransmission of data packets belonging to a first transmission reliability mode is decided based on acknowledgment data packets for data packets already sent over the link, and the device further comprises an output buffer adapted to transmit data packets belonging to a second transmission reliability mode only if the receipt of all previously sent data packets of the first transmission reliability mode has been acknowledged.

16. The communication device of claim 13, further comprising a receiving buffer for receiving data packets of the first structure over a link, said receiving buffer comprising:

a first part associated with a first transmission reliability mode for storing data packets sent in accordance with the first transmission reliability mode; and a second part associated with a second transmission reliability mode for storing data packets sent in accordance with the second transmission reliability mode.

17. The communication device of claim 16, wherein data packets sent in accordance with the first transmission reliability mode are numbered to specify a correct order, and the receiving buffer is adapted to detect in received data packets, a packet delimiter belonging to the data packet of the second data structure embedded in the received data packet of the first data structure sent in accordance with the first transmission reliability mode.

18. The communication device of claim 17, wherein the receiving buffer is further adapted to store the received data packets of the first data structure until either a complete data packet of the second data structure has been received, which is determined by the receipt of the packet delimiters belonging to the data packets of the second data structure, or, for the data packets of the first data structure belonging to the second transmission reliability mode, a predetermined buffer limit is exceeded.

19. The communication device of claim 4, wherein the means for adjusting the operation mode includes means for selecting a transmission mode from among at least a reliable transmission mode, an unreliable transmission mode, and a semi-reliable transmission mode.

20. In a communication device, a method of generating data packets having a first data structure determined by a first protocol, said method comprising the steps of: receiving data packets having a second data structure determined by a second protocol: discriminating between a first type and a second type of received data packets according to predetermined rules based on the contents of the received data packets;
generating data packets having the first data structure by embedding the data packets having the second data structure in at least one of the data packets having the first data structure; and adjusting an operation mode to match the type of received data packet, wherein the operation mode provides a requested transmission quality or level of security.

21. The method of claim 20, wherein the step of adjusting the operation mode includes adjusting a forward error correction mode that includes one or more of frame check sequence based error detection, forward error control based error correction, interleaving-based error prevention, power control, spreading-based error prevention, frame length control, and bandwidth reservation control.

22. The method of claim 20, wherein the data packets of the second structure carry quality requests, and the discriminating step includes discriminating between the data packets of the second data structure on the basis of the quality requests.

23. The method of claim 22, wherein the step of adjusting the operation mode includes adjusting one or more of a transmission quality, transmission priority, and quality of service for at least one of the data packets of the first data structure on the basis of a discriminated quality request.

24. The method of claim 20, wherein the step of adjusting the operation mode includes adjusting the operation mode to be compliant with requirements of a communication link over which the data packets of the first structure are to be sent.

25. The method of claim 20, further comprising the steps of:
selecting an operation mode for each of the data packets of the first data structure from among a plurality of predetermined modes; and
placing each of the data packets of the first data structure into an associated queue in an output buffer having a plurality of separate queues associated with the plurality of predetermined operation modes.

26. The method of claim 25, wherein the separate queues are associated with a predetermined priority order with respect to a transfer of the data packets of the first data structure.

27. The method of claim 26, wherein a first queue is associated with a numbered mode in which data packets are retransmitted, and a second queue is associated with an unnumbered mode, and the method further comprises transmitting data packets stored in the first queue with a higher transmission priority than data packets stored in the second queue.

28. The method of claim 20, wherein the contents of the data packets of the second data structure form a hierarchy, and the discriminating step includes the steps of:
determining identification information for a given data packet of the second data structure;
comparing the identification information with stored rules that allocate a predetermined operation mode to predetermined identification information:
setting the operation mode for the given data packet in accordance with a determined allocation, if the identification information is among the stored rules; and
determining from the contents of the given data packet, higher level identification information associated with a next level in the hierarchy and then comparing the identification information of the next level with the stored rules, if the identification information is not among the stored rules;
wherein the method continues to determine identification information at sequentially higher levels in the given data packet and to compare the identification information with the stored rules until either the identification information is among the stored rules and the operation mode for the given data packet is set in accordance with a determined allocation, or a fail-safe condition is met and a default operation mode for the given data packet is set.

29. The method of claim 20, wherein the step of generating data packets includes segmenting the data packets in accordance with the first protocol in order to embed the data packets of the second data structure in the data packets of the first structure.

30. The method of claim 29, wherein the discriminating step also includes detecting a packet delimiter belonging to a data packet of the second data structure in data packets of the second data structure that are to be embedded, and the generating step includes duplicating the packet delimiter prior to embedding.

31. The method of claim 29, wherein the first protocol is a protocol for sending data packets over a link, and the method further comprises the steps of:
retransmitting data packets belonging to a first transmission reliability mode based on acknowledgment data packets for data packets already sent over the link; and
transmitting data packets belonging to a second transmission reliability mode only if the receipt of all previously sent data packets of the first transmission reliability mode has been acknowledged.

32. The method of claim 29, further comprising the steps of:
receiving by a receiving buffer, data packets of the first structure over a link;
storing data packets sent in accordance with the first transmission reliability mode in a first part of the receiving buffer; and storing data packets sent in accordance with the second transmission reliability mode in a second part of the receiving buffer.

33. The method of claim 32, further comprising the steps of:
numbering data packets sent in accordance with the first transmission reliability mode to specify a correct order; and
the receiving buffer detecting in received data packets, a packet delimiter belonging to the data packet of the second data structure embedded in the received data packet of the first data structure sent in accordance with the first transmission reliability mode.

34. The method of claim 33, further comprising storing in the receiving buffer, the received data packets of the first data structure until either a complete data packet of the second data structure has been received, which is determined by the receipt of the packet delimiters belonging to the data packets of the second data structure, or, for the data packets of the first data structure belonging to the second transmission reliability mode, a predetermined buffer limit is exceeded.

35. The method of claim 20, wherein the step of adjusting the operation mode includes selecting a transmission mode from among at least a reliable transmission mode, an unreliable transmission mode, and a semi-reliable transmission mode.

* * * * *

UNITED STATES PATENT AND TRADEMARK OFFICE
CERTIFICATE OF CORRECTION

PATENT NO. : 7,382,763 B2 Page 1 of 1
APPLICATION NO. : 10/644473
DATED : June 3, 2008
INVENTOR(S) : Ludwig et al.

It is certified that error appears in the above-identified patent and that said Letters Patent is hereby corrected as shown below:

On the Title Page, Item (75), under "Inventors", in Column 1, Line 1, delete "Kensington, CA (US)" and insert -- Düren, DE --, therefor.

Signed and Sealed this

Thirty-first Day of March, 2009

JOHN DOLL
*Acting Director of the United States Patent and Trademark Office*